United States Patent
Masuda et al.

(10) Patent No.: US 9,753,829 B2
(45) Date of Patent: Sep. 5, 2017

(54) POWER MEASUREMENT APPARATUS AND POWER MEASUREMENT METHOD

(71) Applicant: FUJITSU LIMITED, Kawasaki-shi, Kanagawa (JP)

(72) Inventors: Mari Masuda, Kawasaki (JP); Haruhiko Ueno, Sagamihara (JP); Atsushi Takami, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 100 days.

(21) Appl. No.: 14/867,044

(22) Filed: Sep. 28, 2015

(65) Prior Publication Data

US 2016/0109918 A1 Apr. 21, 2016

(30) Foreign Application Priority Data

Oct. 15, 2014 (JP) ................................ 2014-210782

(51) Int. Cl.
| | |
|---|---|
| G06F 11/30 | (2006.01) |
| G06F 11/24 | (2006.01) |
| G06F 1/26 | (2006.01) |
| G06F 1/20 | (2006.01) |

(52) U.S. Cl.
CPC .......... *G06F 11/3062* (2013.01); *G06F 1/206* (2013.01); *G06F 1/26* (2013.01); *G06F 11/24* (2013.01); *G06F 11/3058* (2013.01)

(58) Field of Classification Search
CPC .. G06F 11/3062; G06F 11/3058; G06F 11/24; G06F 1/26; G06F 1/206
See application file for complete search history.

(56) References Cited

U.S. PATENT DOCUMENTS

2007/0074011 A1 3/2007 Borkar et al.
2013/0073880 A1 3/2013 Miyazaki

FOREIGN PATENT DOCUMENTS

| JP | 02-038975 | 2/1990 |
|---|---|---|
| JP | 10-103737 | 4/1998 |
| JP | 2012-098135 | 5/2012 |
| JP | 2014-174755 A | 9/2014 |

OTHER PUBLICATIONS

Extended European Search Report dated May 11, 2016 for corresponding European Patent Application No. 15186029.3, 7 pages.

*Primary Examiner* — Stefan Stoynov
(74) *Attorney, Agent, or Firm* — Fujitsu Patent Center (57) ABSTRACT

A power measurement apparatus of a computer including logical units each including a CPU chip having CPU cores and a peripheral apparatus, a dedicated power supply apparatus for the respective CPU cores, and a common power supply apparatus for the peripheral apparatuses including: an output power generating unit that acquires output voltage and current of the dedicated power supply apparatus and generates output power thereof, a temperature acquiring unit that acquires a temperature of the CPU chip, an operation rate generating unit that generates an operation rate of the CPU core, a power consumption estimating unit which estimates power consumption of the peripheral apparatuses of the first and second logical units, and a power consumption generating unit that generates respective power consumption of the first and second logical units by summing up the output power of the dedicated power supply apparatus and the estimated power consumption of the peripheral apparatuses.

13 Claims, 9 Drawing Sheets

EXAMPLE OF POWER SUPPLY APPARATUS DDC

EXAMPLES OF POWER CONSUMPTION COEFFICIENTS a(T) AND b(T) OF CPU CORE

| PACKAGE TEMPERATURE T (°C) | CPU CORE OPERATION RATE-INDEPENDENT POWER CONSUMPTION COEFFICIENT b(T)(W) | CPU CORE OPERATION RATE-DEPENDENT POWER CONSUMPTION COEFFICIENT a(T)(W) |
|---|---|---|
| 100 | 70.0 | 100.0 |
| 90 | 66.8 | 94.8 |
| 80 | 63.2 | 89.2 |
| 70 | 59.2 | 83.2 |
| 60 | 54.8 | 76.8 |
| 50 | 50.0 | 70.0 |
| 40 | 44.8 | 62.8 |
| 30 | 39.2 | 55.2 |
| 20 | 33.2 | 47.2 |
| 10 | 26.8 | 38.3 |
| 0 | 20.0 | 30.0 |

POWER MEASUREMENT APPARATUS AND POWER MEASUREMENT METHOD

CROSS-REFERENCE TO RELATED APPLICATION

This application is based upon and claims the benefit of priority of the prior Japanese Patent Application No. 2014-210782, filed on Oct. 15, 2014, the entire contents of which are incorporated herein by reference.

FIELD

The present invention relates to a power measurement apparatus and a power measurement method.

BACKGROUND

In computer systems such as a high-density server, a plurality of logical units are mounted in one housing or motherboard. Each logical unit includes a CPU chip that integrates one or a plurality of CPU cores and an input/output circuit, a plurality of memory chips, and an interface apparatus to the outside. In such a computer system, a first DC voltage is supplied to the plurality of logical units from an external power supply unit, and a power supply apparatus that is a DC voltage conversion device performs voltage conversion of the first DC voltage to generate second and third DC voltages and supplies the second and third DC voltages to the CPU chip, memory chip, external interface apparatus, and the like in each logical unit.

By supplying the first DC voltage to each logical unit at a relatively high voltage from an external power supply unit, converting the first DC voltage into second and third DC voltages that are lower than the first DC voltage with a power supply apparatus located in a vicinity of each logical unit, and supplying the second and third DC voltages to LSI chips and the like in each logical unit as power supply voltages, power loss due to an IR drop in power supply voltage wiring from the external power supply unit to the logical units is reduced.

A general computer system is configured such that power can be turned on/off on a per logical unit basis. Therefore, each logical unit is provided with a dedicated power supply apparatus that supplies a power supply voltage to an LSI chip and the like that is mounted to the logical unit. As a result, by summing up output voltages of a power supply apparatus that is exclusively provided for a logical unit, power consumption of each logical unit is measured. Measuring a power consumption is disclosed in Japanese Patent Application Laid-open No. 2012-98135, Japanese Patent Application Laid-open No. H10-103737 and Japanese Patent Application Laid-open No. H02-38975.

SUMMARY

However, with a high-performance server, a super computer, and the like, in order to further increase package density, a plurality of logical units are mounted onto one motherboard. As a result, there is a mixture of power supply apparatuses including power supply apparatuses that are dedicated to each logical unit and power supply apparatuses that are shared by a plurality of logical units. Consequently, it is difficult to acquire power consumption for each logical unit.

One aspect of the present embodiment is a power measurement apparatus of an information processing apparatus, the information processing apparatus including a plurality of logical units each including a CPU chip having a CPU core and a peripheral apparatus at least including a memory, a dedicated power supply apparatus that supplies a power supply voltage to the respective CPU cores, and a common power supply apparatus that supplies a power supply voltage to the peripheral apparatuses of the plurality of logical units, the power measurement apparatus comprising: an output power generating unit that acquires an output voltage and an output current of the dedicated power supply apparatus and generates output power of the dedicated power supply apparatus; a temperature acquiring unit that acquires a temperature of the CPU chip; an operation rate generating unit that generates an operation rate of the CPU core from a first power consumption coefficient which is independent of the operation rate of the CPU core and a second power consumption coefficient which is dependent on the operation rate of the CPU core and which are coefficients with respect to the temperature of the CPU chip and also from the output power; a power consumption estimating unit which estimates power consumption of the peripheral apparatuses of the first logical unit from the first power consumption coefficient and the second power consumption coefficient which are coefficients with respect to a temperature of the peripheral apparatuses of the first logical unit and also from the operation rate of the CPU core of the first logical unit, and which estimates power consumption of the peripheral apparatuses of the second logical unit from the first power consumption coefficient and the second power consumption coefficient which are coefficients with respect to a temperature of the peripheral apparatuses of the second logical unit and also from the operation rate of the CPU core of the second logical unit; and a power consumption generating unit that generates respective power consumption of the first and second logical units by summing up the output power of the dedicated power supply apparatus and the estimated power consumption of the peripheral apparatuses for each of the first and second logical units.

According to the first aspect, power consumption of each logical unit can be acquired.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1:
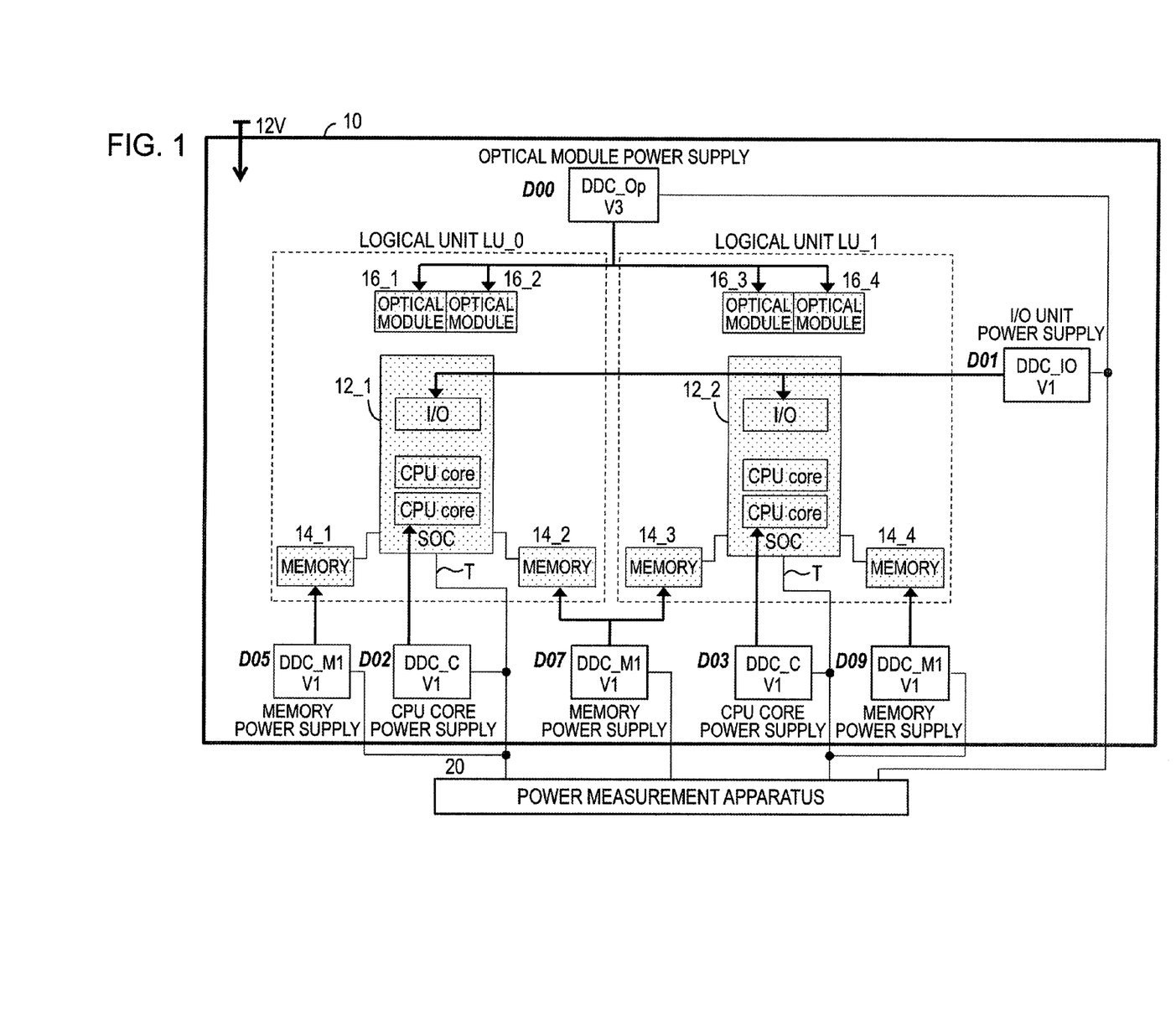
FIG. 1 is a diagram illustrating an example of an information processing apparatus that is measured by a power measurement apparatus according to the present embodiment.

FIG. 1 is a diagram illustrating an example of an information processing apparatus that is measured by a power measurement apparatus according to the present embodiment. In the information processing apparatus (computer) illustrated in FIG. 1, a plurality of logical units LU_0 and LU_1 and power supply apparatuses D00 to D03, D05, D07, and D09 that supply power supply voltage to a group of devices in the logical units are mounted to a housing or a motherboard 10. Each logical unit LU is mounted with a CPU chip (SOC: System on a chip) 12 including a single or a plurality of CPU cores and an input/output apparatus I/O, a memory 14 such as a DRAM that is accessed by the CPU chip 12, and an optical module 16 that is an interface with an external information processing apparatus or storage apparatus. In the present embodiment, the memory 14, the optical module 16, and the like will be referred to as peripheral apparatuses.

While the two logical units LU_0 and LU_1 illustrated in FIG. 1 have the same configuration, the two logical units may be equipped with different numbers of the optical module 16 and the memory 14 and CPU chips 12_1 and 12_2 may include different numbers of CPU cores.

A DC voltage of, for example, 12 V is supplied from the outside to the information processing apparatus 10 illustrated in FIG. 1. In addition, the power supply apparatuses D00 to D03, D05, D07, and D09 convert the external DC voltage to DC voltage to be supplied to the respective devices and apparatuses. The power supply apparatuses are DC-DC converters which, for example, convert an externally-supplied DC voltage (12 V) into an internal DC power supply voltage.

The power supply apparatus D00 is shared by a plurality of or, more specifically, a total of four optical modules 16_1 to 16_4 in the two logical units and supplies a power supply voltage V3 that is common to the plurality of optical modules 16_1 to 16_4. The power supply apparatus D01 is shared by input/output apparatus I/Os in the CPU chips 12_1 and 12_2 of the two logical units and supplies a power supply voltage V1 that is common to the plurality of input/output apparatus I/Os.

The power supply apparatuses D02 and D03 are respectively exclusively provided in groups of CPU cores in the CPU chips 12_1 and 12_2 in the logical units LU_0 and LU_1 and supply a power supply voltage V1 of the respective groups of CPU cores. The power supply apparatuses D05 and D09 are respectively exclusively provided in memories 14_1 and 14_4 in the logical units LU_0 and LU_1 and supply a power supply voltage V1 of the respective memories 14_1 and 14_4. Meanwhile, the power supply apparatus D07 is commonly provided for memories 14_2 and 14_3 in the logical units LU_0 and LU_1 and supplies a power supply voltage V1 that is common to both memories 14_2 and 14_3.

As described above, the power supply apparatuses D02, D03, D05, and D09 are dedicated power supply apparatuses that are exclusively provided in each of the plurality of logical units LU_0 and LU_1 and power supply voltages generated thereby are not shared by the plurality of logical units. On the other hand, the power supply apparatuses D00, D01, and D07 are common power supply apparatuses that are commonly provided in the plurality of logical units LU_0 and LU_1 and power supply voltages generated thereby are shared by the plurality of logical units. By providing common power supply apparatuses, the number of power supply apparatuses are reduced to reduce an area of the motherboard 10 and downsize the information processing apparatus, or a larger number of logical units LU are mounted inside the motherboard 10.

A power measurement apparatus 20 according to the present embodiment is capable of: communicating with all power supply apparatuses D## and all CPU chips 12; acquiring data regarding respective output voltages and output currents from the power supply apparatuses D##; and acquiring data regarding a temperature T obtained by a temperature sensor built into the CPU chips 12. Communication between the power measurement apparatus 20 and the power supply apparatuses D## or the CPU chips 12 is performed by a communication system capable of 1-bit communication such as $I^2C$.

Alternatively, a configuration may be adopted in which temperature sensors are also mounted to the memory 14 and the optical module 16 so that temperature data thereof are acquired by the power measurement apparatus 20 by communicating with the memory 14 and the optical module 16.

Figure 2:
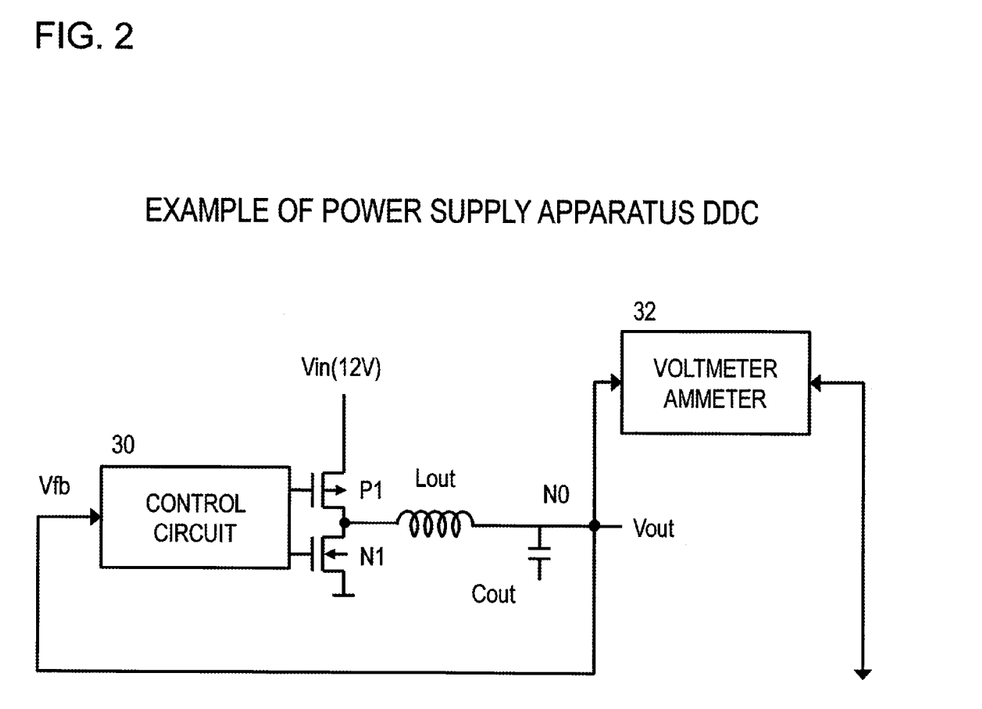
FIG. 2 is a diagram illustrating an example of a power supply apparatus according to the present embodiment.

FIG. 2 is a diagram illustrating an example of a power supply apparatus according to the present embodiment. The power supply apparatus illustrated in FIG. 2 is a DC-DC converter that steps down a DC input voltage Vin to generate a DC output voltage Vout. The power supply apparatus illustrated in FIG. 2 includes a switching unit having a PMOS transistor P1 and an NMOS transistor N1, an inductor Lout connected between a drain connection node of the transistors and an output terminal N0, and a capacitor Cout connected to the output terminal N0, and the output voltage Vout is input to a control circuit 30 as a feedback voltage Vfb. The control circuit 30 compares the feedback voltage Vfb with a reference voltage (not illustrated) and generates a gate pulse for conducting the transistor P1 so that the output voltage Vout is maintained at a desired voltage. Once the transistor P1 is conducted, a current is supplied to the capacitor Cout from the input voltage Vin via the transistor P1 and the inductor Lout, and after the transistor P1 is turned off, the transistor N1 is controlled to be conducted so that current is continuously supplied from the inductor Lout to the capacitor Cout. The output voltage Vout is supplied to the respective chips and apparatuses as a power supply voltage.

The power supply apparatus illustrated in FIG. 2 further includes a voltage measurement circuit and a current measurement circuit 32 that measure voltage and current of the output terminal N0. In addition, in response to a communication from the power measurement apparatus 20, data regarding a measured output voltage and a measured output current is sent back to the power measurement apparatus 20. Accordingly, the power measurement apparatus 20 acquires data regarding an output voltage and an output current that are output by each power supply apparatus and acquires data regarding power output by each power supply apparatus.

Returning to FIG. 1, the power measurement apparatus 20 acquires output power of each power supply apparatus D00 to D09 as described above. However, the power supply apparatus D00 of the optical modules, the power supply apparatus D01 of the I/O units, and the power supply apparatus D07 of the memories 14_2 and 14_3 are common power supply apparatuses that are shared by the first and second logical units LU_0 and LU_1. Therefore, in order to determine power consumption by each of the first and second logical units LU_0 and LU_1, a proportion of consumption of the output power of the common power supply apparatuses by the two logical units needs to be acquired.

In consideration thereof, the power measurement apparatus 20 according to the present embodiment estimates power consumption of output power of a common power supply apparatus by the two logical units based on output power of each power supply apparatus and a temperature T of the CPU chips 12_1 and 12_2.

Figure 3:
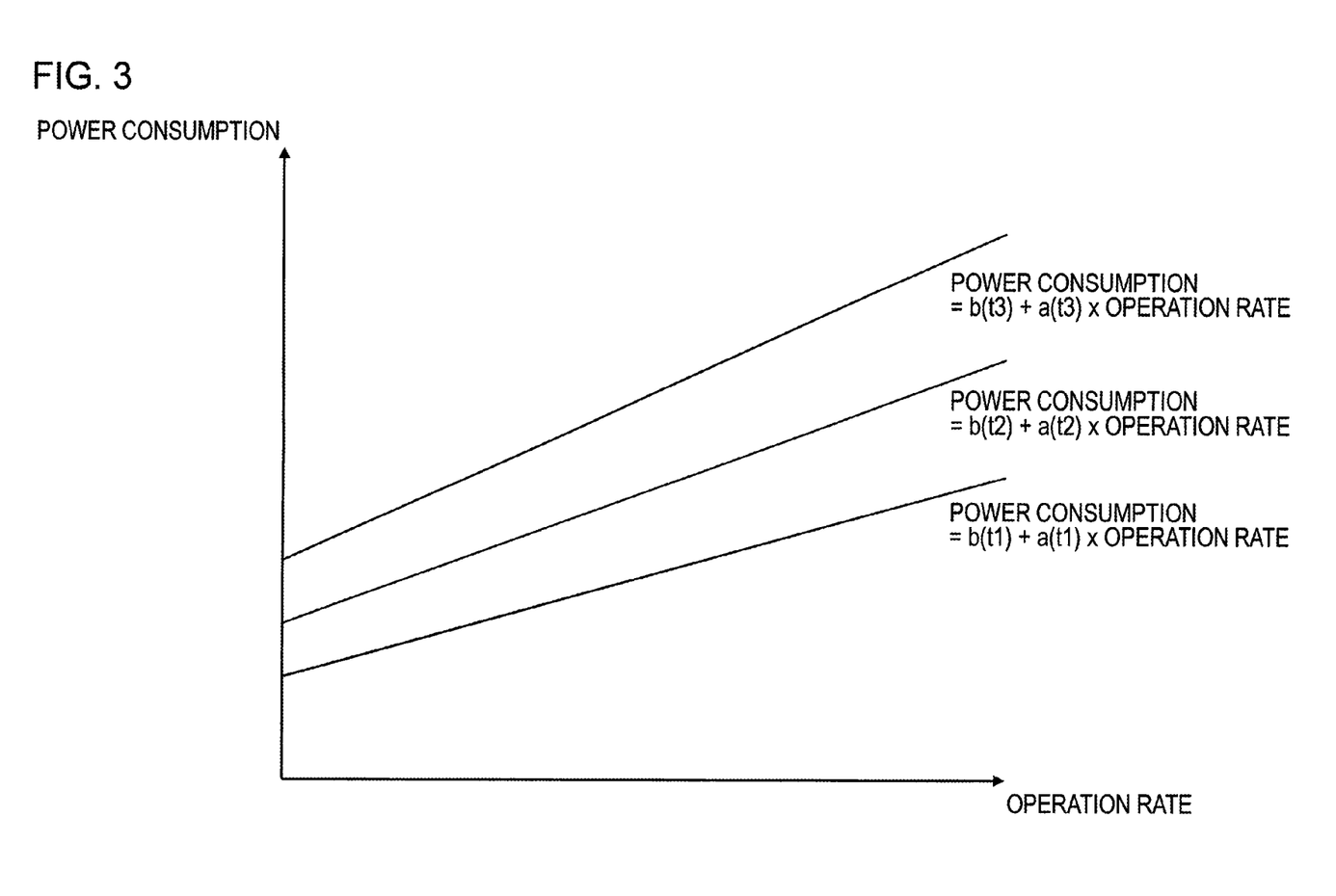
FIG. 3 is a diagram illustrating relationships between power consumption by a semiconductor device such as a CPU core, a memory, and an optical module and an operation rate.

FIG. 3 is a diagram illustrating relationships between power consumption by a semiconductor device such as a CPU core, a memory, and an optical module and an operation rate. An operation rate refers to a frequency of executing a prescribed operation per unit time and, in the case of a CPU core, corresponds to the number of instructions or the like executed by the CPU core per unit time, in the case of a memory, the number of times the memory is accessed per unit time, and in the case of an optical module or an input/output apparatus I/O, the number of inputs and outputs per unit time.

A circuit formed on a semiconductor substrate made of silicon or the like statically consumes power when a power supply is turned on even if no particular operation is performed, and consumes power depending on an operation rate as the operation rate increases. Therefore, power consumption at a given operation rate is approximated by the following linear expression.

Power consumption $(t)=b(t)+a(t)\times$operation rate    (Expression 1).

In Expression 1, $b(t)$ denotes power consumption independent of the operation rate and $a(t)$ denotes power consumption dependent on the operation rate.

In addition, both the operation rate-independent power consumption coefficient $b(t)$ and the operation rate-dependent power consumption coefficient $a(t)$ tend to increase as a temperature t rises. In other words, as the temperature t rises, a leakage current generated in a non-operating state increases and a current consumed in an operating state also increases.

In consideration thereof, in the present embodiment, with respect to a CPU core, a memory, an optical module, and an input/output apparatus, power consumption is measured at different temperatures in a prescribed temperature range and respective first power consumption coefficients $b(t)$ that are operation rate-independent and respective second power consumption coefficients $a(t)$ that are operation rate-dependent are obtained in advance. Subsequently, when the information processing apparatus is running, an operation rate of the CPU core is calculated based in Expression 1 above, the calculated operation rate of the CPU core is estimated to be an operation rate of a logical unit LU, and power consumption of peripheral apparatuses to which a power supply voltage is supplied from a common power supply apparatus is estimated based on the estimated operation rate and power coefficients $b(t)$ and $a(t)$ with respect to temperatures of the respective apparatuses.

Figure 4:
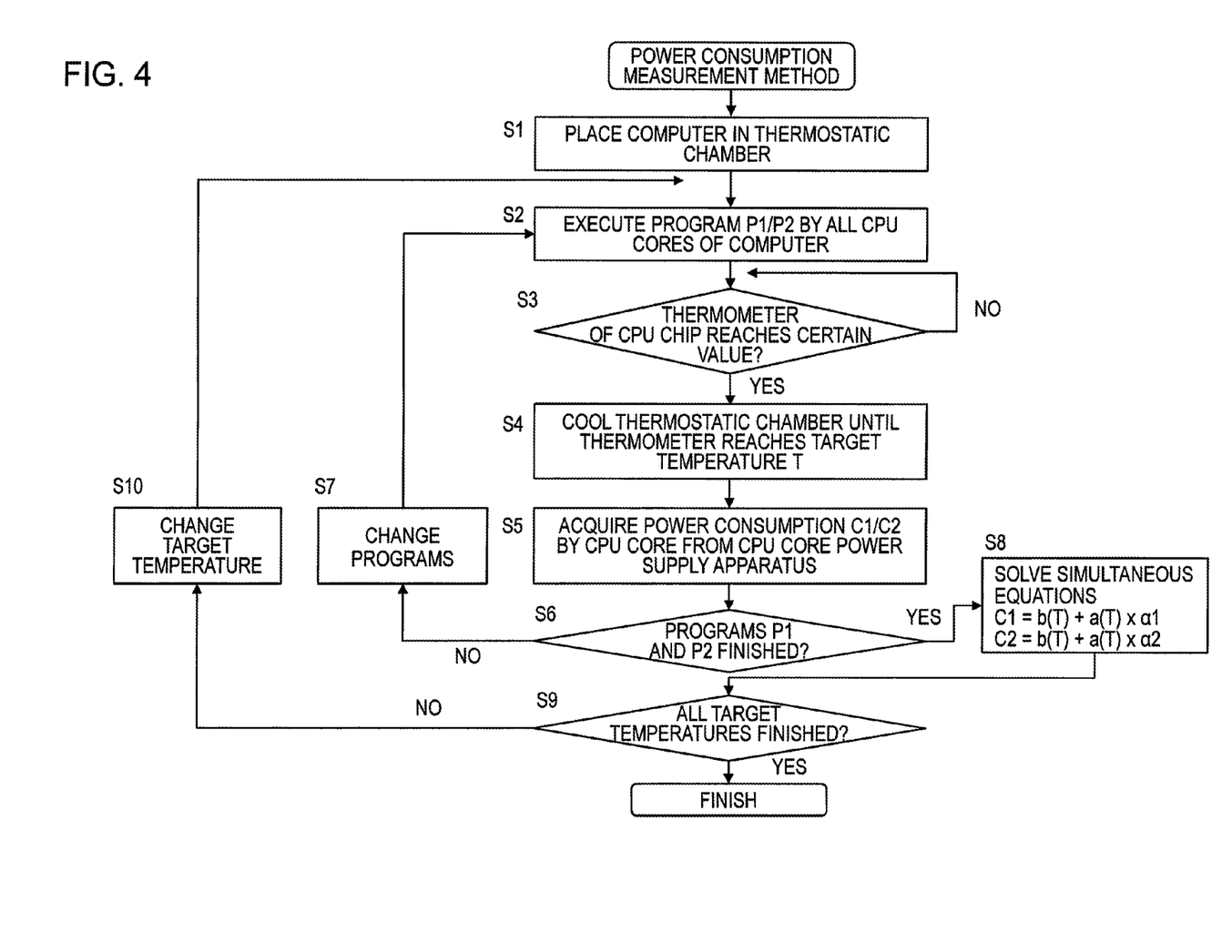
FIG. 4 is a flow chart illustrating a power consumption measurement method for obtaining the first and second power coefficients b(t) and a(t) according to the present embodiment.

FIG. 4 is a flow chart illustrating a power consumption measurement method for obtaining the first and second power coefficients $b(t)$ and $a(t)$ according to the present embodiment. First, the two programs below are prepared in advance.

A first program which continuously executes a same operation and for which an operation rate $\alpha 1$ of a CPU core is small.

A second program which continuously executes a same operation and for which an operation rate $\alpha 2$ of a CPU core is large.

The operation rates $\alpha 1$ and $\alpha 2$ of the CPU core when executing the first and second programs are to be obtained in advance by simulation or the like.

Subsequently, a housing or a motherboard of a computer that is the information processing apparatus illustrated in FIG. 1 is inserted into a thermostatic chamber (S1). Next, the first program is executed by all CPU cores of the computer (S2) and a thermometer built into a package of the CPU chip 12 is awaited to reach a certain value (S3). In this case, the temperature of the package stabilizes at the certain value in a state where heat generated by power consumption inside the CPU chip and heat radiation due to temperature inside the thermostatic chamber are balanced.

In a state where the thermometer has reached the certain temperature, the thermostatic chamber is cooled (or heated) until the thermometer reaches a target temperature T (S4). Subsequently, the power measurement apparatus 20 acquires power consumption C1 by the CPU core when the thermometer is maintained at the target temperature T from the power supply apparatuses D02 and D03 for the CPU core (S5). Accordingly, the power consumption C1 by the CPU core at the operation rate $\alpha 1$ and the target temperature T is acquired.

Next, the first program is switched to the second program and the steps S2 to S5 described above are repeated. Accordingly, power consumption C2 by the CPU core at the operation rate $\alpha 2$ and the target temperature T is acquired.

Subsequently, the following simultaneous equations obtained by substituting the operation rates $\alpha 1$ and $\alpha 2$, the temperature T, and the power consumption C1 and C2 into Expression 1 described earlier are solved to calculate first and second power consumption coefficients $b(T)$ and $a(T)$ of the CPU chip at the temperature T (S8). This calculation may be performed by the power measurement apparatus 20 or by another personal computer and the like.

$C1=b(T)+a(T)\times\alpha 1$ $C2=b(T)+a(T)\times\alpha 2$

The first and second power consumption coefficients $b(T)$ and $a(T)$ derived by the series of processes described above are repetitively obtained with respect to a plurality of target temperatures T within an operating temperature range. Accordingly, data regarding the first and second power consumption coefficients $b(T)$ and $a(T)$ with respect to different operating temperatures T of a CPU core (when the CPU chip includes a plurality of CPU cores, the group of CPU cores: the same description will apply hereinafter) is acquired.

Figure 5:
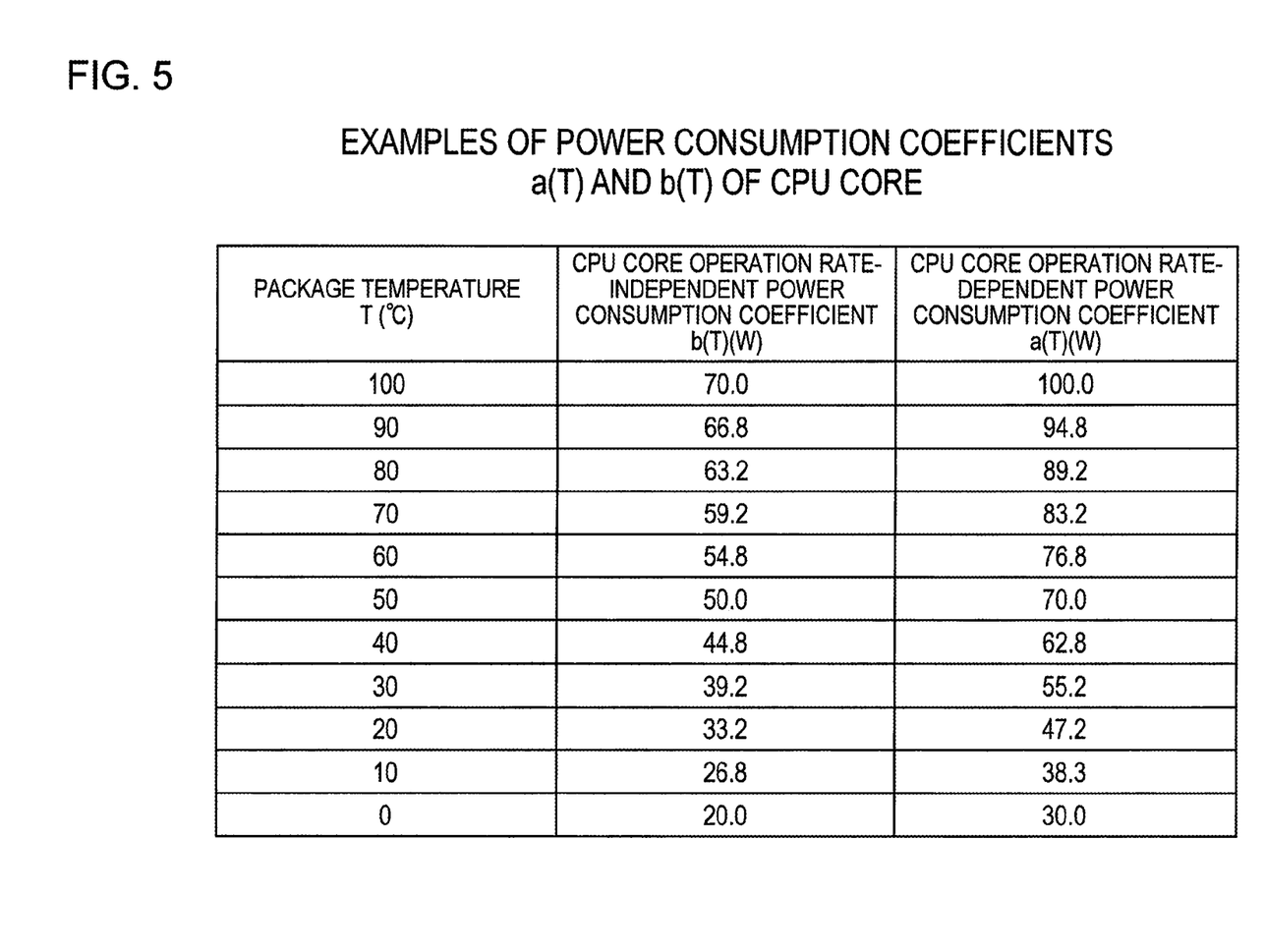
FIG. 5 is a diagram illustrating an example of data regarding the first and second power consumption coefficients b(T) and a(T) of a CPU core with respect to package temperatures T.

FIG. 5 is a diagram illustrating an example of data regarding the first and second power consumption coefficients $b(T)$ and $a(T)$ of a CPU core with respect to package temperatures T. The example illustrated in FIG. 5 includes the first and second power consumption coefficients b(T) and a(T) for every 10° of the package temperature T ranging from 0° to 100°. Even in this example, the higher the package temperature T, the higher the wattages of the first and second power consumption coefficients b(T) and a(T).

In the present embodiment, furthermore, data regarding the first and second power consumption coefficients b(T) and a(T) with respect to different operating temperatures is also acquired with respect to the memories 14, the input/output apparatuses I/O, and the optical modules 16 according to the method illustrated in FIG. 4. The data in this case is desirably data per one memory, data per one input/output apparatus, and data per one optical module.

For example, in the case of the memory 14, the program P1 that causes an operation rate of the memory 14 to assume the smaller operation rate $\alpha 1$ and the program P2 that causes the larger operation rate $\alpha 2$ to be assumed based on memory access frequency or the like are executed by all CPU cores, and data regarding the first and second power consumption coefficients b(T) and a(T) with respect to different operating temperatures of the memory 14 is acquired according to the method illustrated in FIG. 4. In the configuration illustrated in FIG. 1, for example, power consumption of one memory is acquired by dividing the power consumption of memory-dedicated power supply apparatuses D05 and D09 by the number of memories. Since the computer is inserted into the thermostatic chamber and a temperature of a package of a memory becomes equal to a temperature of a CPU chip, an operating temperature of a memory is acquired from a thermometer of a CPU chip.

Similarly, with respect to the respective input/output apparatuses I/O and the respective optical modules 16, by having the CPU cores execute the first and second programs that enable operation rates of the input/output apparatuses I/O and the optical modules 16 to assume the operation rates $\alpha 1$ and $\alpha 2$, data regarding the first and second power consumption coefficients b(T) and a(T) with respect to different operating temperatures is acquired in a similar manner. In the configuration illustrated in FIG. 1, power consumption of one input/output apparatus is acquired by dividing the power consumption of the common power supply apparatus D00 by the number of input/output apparatuses. The same description applies to optical modules.

In the present embodiment, after respectively acquiring data regarding the first and second power consumption coefficients with respect to the different operating temperatures T illustrated in FIG. 5 with respect to the CPU cores, the memories, the input/output apparatuses I/O, and the optical modules, power consumption of a logical unit is measured according to a method described below.

Figure 6:
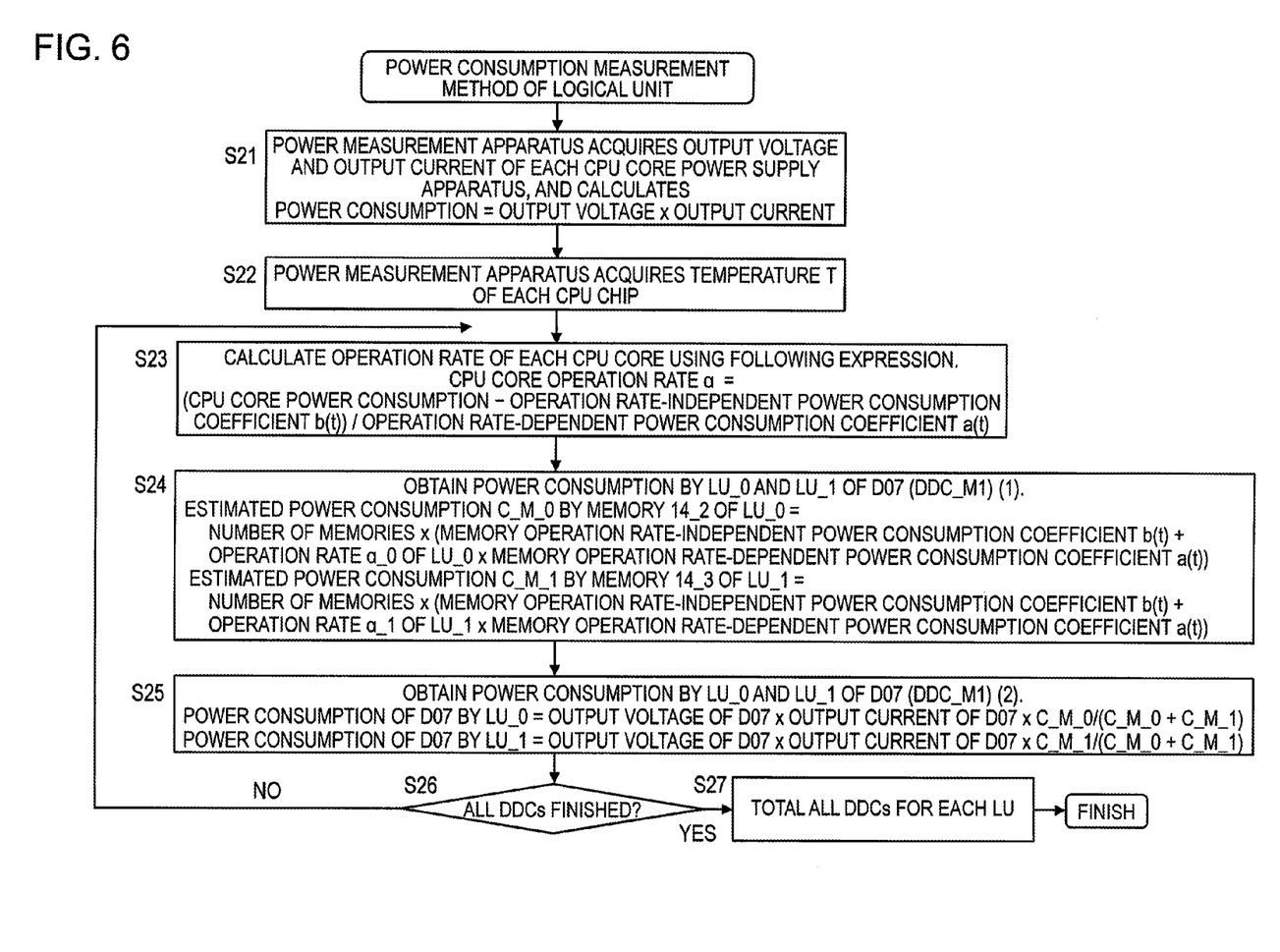
FIG. 6 is a flow chart illustrating a power consumption measurement method of a logical unit according to the present embodiment.

FIG. 6 is a flow chart illustrating a power consumption measurement method of a logical unit according to the present embodiment. In order to acquire power consumption by each logical unit when a computer that is the information processing apparatus illustrated in FIG. 1 is executing an actual program, an operation rate of each logical unit needs to be acquired. This is because, for each device, obtaining a temperature t as well as first and second power consumption coefficients b(t) and a(t) and an operation rate with respect to the temperature t enables power consumption of each device to be estimated based on Expression 1 given earlier. In addition, once the power consumption of each device is obtained, power consumption of each logical unit is obtained by adding up power consumption of devices that are mounted to each logical unit.

As illustrated in FIG. 6, in a state where the computer is executing an actual program, the power measurement apparatus 20 first acquires data regarding output voltages and output currents of the power supply apparatuses D02 and D03 of CPU cores via communication and calculates power consumption C by each CPU core by multiplying the acquired output voltages and output currents (S21).

Next, the power measurement apparatus 20 acquires a temperature T from a thermometer provided in a package of each CPU chip (S22). Data regarding the temperature T is similarly acquired by the power measurement apparatus 20 using communicating means.

Subsequently, the power measurement apparatus 20 calculates operation rates $\alpha\_0$ and $\alpha\_1$ of a CPU core (or a group of CPU cores) in each CPU chip 12_1 and 12_2 according to Expression 2 below that is a transformation of Expression 1 given earlier (S23).

Operation rate of CPU core=(Power consumption $C$ of CPU core−first power consumption coefficient $b(T)$)/second power consumption coefficient $a(T)$ (Expression 2)

At this point, the power measurement apparatus 20 refers to data regarding the first and second power consumption coefficients b(t) and a(t) with respect to different operating temperatures of the CPU core which has been acquired in advance, extracts data regarding the first and second power consumption coefficients b(T) and a(T) with respect to the acquired operating temperature T, and substitutes the data into Expression 2.

The operation rates $\alpha\_0$ and $\alpha\_1$ of each CPU core obtained in this manner are estimated to be operation rates $\alpha\_0$ and $\alpha\_1$ of the respective logical units LU_0 and LU_1.

Next, the power measurement apparatus 20 estimates power consumption C_M_0 and C_M_1 of memories 14_2 and 14_3 of the first and second logical units LU_0 and LU_1 according to the following expressions (S24).

Estimated power consumption $C\_M\_0$ of memory 14_2 of $LU\_0$=number of memories×(operation rate-independent power consumption coefficient $b(t)$ of memory+operation rate $\alpha\_0$ of $LU\_0$× operation rate-dependent power consumption coefficient $a(t)$ of memory) (Expression 3)

Estimated power consumption $C\_M\_1$ of memory 14_3 of $LU\_1$=number of memories×(operation rate-independent power consumption coefficient $b(t)$ of memory+operation rate $\alpha\_1$ of $LU\_1$× operation rate-dependent power consumption coefficient $a(t)$ of memory) (Expression 4)

In this case, the number of memories refers to the number of memories included in each logical unit. The number of memories is one in the example illustrated in FIG. 1. In addition, operating temperatures of the memories 14_2 and 14_3 are estimated to be, for example, the same as an operating temperature of the CPU chip in the same logical unit. Furthermore, operation rates of the memories 14_2 and 14_3 are estimated to be the same as operation rates $\alpha\_0$ and $\alpha\_1$ of the same logical unit. Moreover, as described earlier, the operation rates $\alpha\_0$ and $\alpha\_1$ of the logical units are estimated to be equal to operation rates of the respective CPU cores obtained by Expression 2.

The operating temperature of a memory may also be estimated from the operating temperature of a CPU chip and an external temperature of a computer. For example, an operating temperature of a CPU chip, an external temperature, and an operating temperature of a memory in a case where a computer is operated are measured in advance by an experiment, and the operating temperature of the memory is estimated from the operating temperature of the CPU chip and the external temperature based on a correspondence relationship among the measured values. Generally, there is a relationship that the operating temperature of the memory rises as the operating temperature of the CPU chip rises. Furthermore, a relationship conceivably exists that differences between operating temperatures of the CPU chip and the memory varies between a case where the external temperature is high and therefore a heat radiating effect is low and a case where the external temperature is low and therefore a heat radiating effect is high. An operating voltage of a memory may be estimated based on such relationships.

In step S24 described above, the power measurement apparatus 20 refers to data regarding the first and second power consumption coefficients b(t) and a(t) with respect to different operating temperatures of the memory, and extracts data regarding the first and second power consumption coefficients b(t) and a(t) with respect to a present operating temperature and substitutes the data into Expressions 3 and 4 given above.

As described above, by computing Expressions 3 and 4 in step S24, the power measurement apparatus 20 obtains power consumption C_M_0 and C_M_1 of the respective memories 14_2 and 14_3 of the two logical units to which power supply voltage is supplied from the common power supply apparatus D07. Since the power consumption C_M_0 and C_M_1 of the memories 14_2 and 14_3 according to Expressions 3 and 4 are calculated based on the first and second power consumption coefficients b(t) and a(t) corresponding to the operating temperature obtained by experiment with respect to the memories and on the operation rates α_0 and α_1 of the CPU core chips in the respective logical units, the power consumption C_M_0 and C_M_1 are described as estimated power consumption with relatively high accuracy.

In the present embodiment, in order to obtain power consumption by the memories 14_2 and 14_3 with higher accuracy, the estimated power consumption C_M_0 and C_M_1 calculated in step S24 are corrected according to a method described below. Specifically, in step S25 in FIG. 6, the power measurement apparatus 20 calculates power consumption by the first and second logical units LU_0 and LU_1 of the common power supply apparatus D07 by acquiring an output voltage and an output current of the common power supply apparatus D07 via communicating means and proportionally dividing an actual power consumption obtained by multiplying the output voltage and the output current by the estimated power consumption C_M_0 and C_M_1. In other words, the calculation is performed according to Expressions 5 and 6 given below.

Power consumption of D07 by LU_0=output voltage of D07×output current of D07×C_M_0/ (C_M_0+C_M_1)     (Expression 5)

Power consumption of D07 by LU_1=output voltage of D07×output current of D07×C_M_1/ (C_M_0+C_M_1)     (Expression 6)

Since the actual power consumption of the common power supply apparatus D07 is proportionally divided by estimated power consumption C_M_0 and C_M_1 in Expressions 5 and 6, the power consumption of the common power supply apparatus D07 by LU_0 in Expression 5 is a highly accurate power consumption by the memory 14_2 of the logical unit LU_0 and the power consumption of the common power supply apparatus D07 by LU_1 in Expression 6 is a highly accurate power consumption by the memory 14_3 of the logical unit LU_1.

The power measurement apparatus 20 also executes steps S23, S24, and S25 described above with respect to all common power supply apparatuses D00 and D01. In this case, an operating temperature of an optical module is estimated by a similar method to the method used to estimate an operating temperature of a memory. In addition, an operating temperature of an input/output apparatus I/O is equal to an operating temperature of a CPU core chip.

Subsequently, once power supplied to the two logical units is obtained for all common power supply apparatuses (YES in S26), the power measurement apparatus 20 sums up power consumption of dedicated power supply apparatuses corresponding to the respective logical units and power distributed from the common power supply apparatuses to calculate power consumption of each logical unit (S27).

Figure 7:
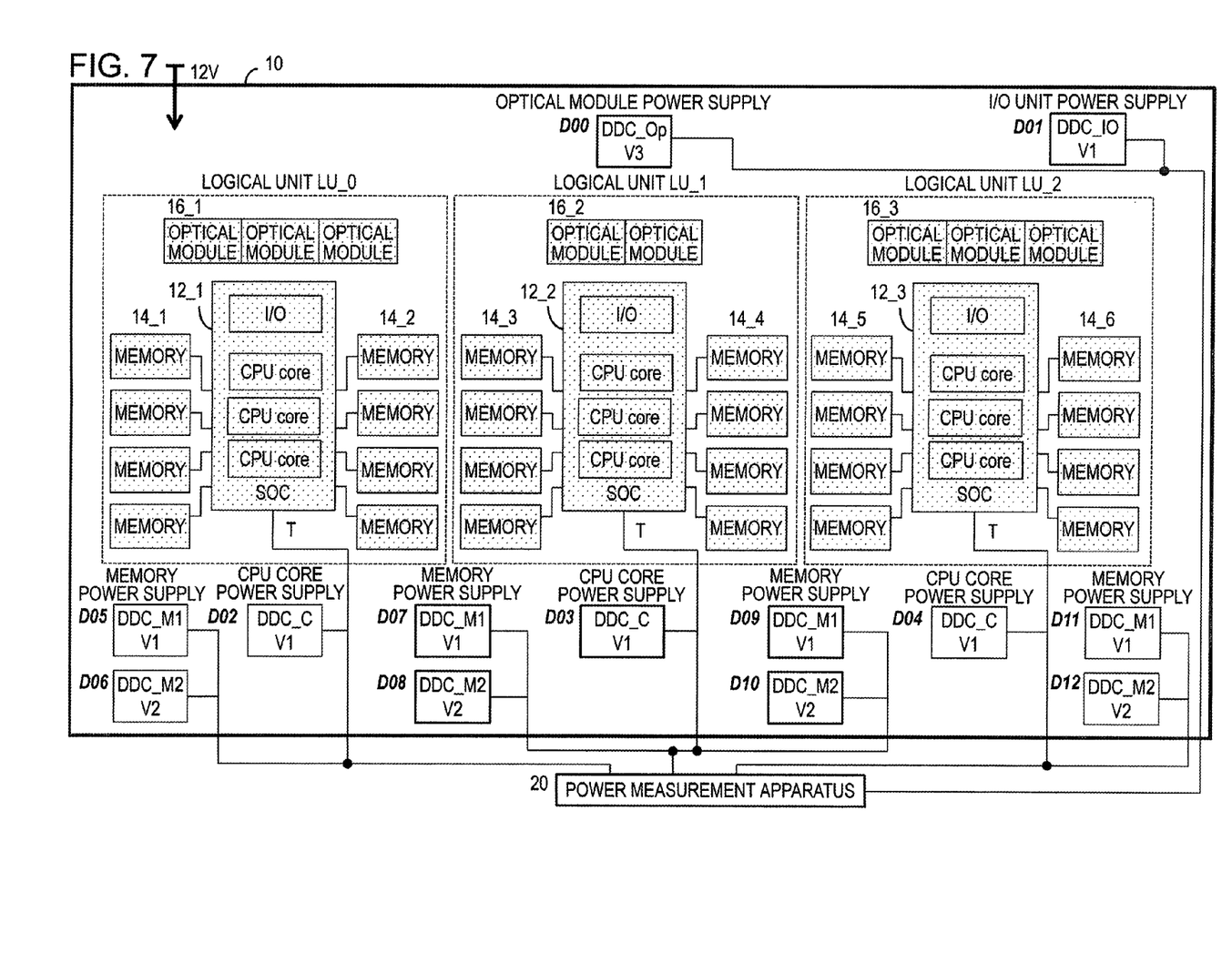
FIG. 7 is a diagram illustrating a configuration example of an information processing apparatus that differs from FIG. 1.

FIG. 7 is a diagram illustrating a configuration example of an information processing apparatus that differs from FIG. 1. The measurement of power consumption according to the present embodiment may also be performed on the information processing apparatus illustrated in FIG. 7.

A housing or a motherboard 10 of a computer that is the information processing apparatus illustrated in FIG. 7 includes three logical units LU_0, LU_1, and LU_2, and power supply apparatuses D00 to D12. In addition, each logical unit includes CPU chips 12_1, 12_2, and 12_3 respectively having three CPU cores (a group of CPU cores) and an input/output apparatus I/O, and pairs of memory groups 14_1 and 14_2, 14_3 and 14_4, and 14_5 and 14_6, memory groups are respectively constituted by four memories. Furthermore, left and right logical units LU_0 and LU_2 both include three optical modules 16_1, 16_2, and 16_3, and a center logical unit LU_1 includes two optical modules 16.

The power supply apparatus D02 dedicated to a group of CPU cores supplies a power supply voltage to the group of CPU cores in the CPU chip 12_1 of the logical unit LU_0. In a similar manner, the dedicated power supply apparatuses D03 and D04 also supply a power supply voltage to the respective groups of CPU cores in the CPU chips 12_2 and 12_3 of the logical units LU_1 and LU_2.

In the information processing apparatus illustrated in FIG. 7, a memory power supply is made up of two types of voltages V1 and V2. Accordingly, the dedicated power supply apparatuses D05 and D06 that generate memory power supply voltages supply respective power supply voltages V1 and V2 to the memory group 14_1 in the logical unit LU_0 and the dedicated power supply apparatuses D11 and D12 supply power supply voltages V1 and V2 to the memory group 14_6 in the logical unit LU_2.

In addition, the common power supply apparatuses D07 and D08 supply power supply voltages V1 and V2 to the memory groups 14_2 and 14_3 in two adjacent logical units LU_0 and LU_1. In a similar manner, the common power supply apparatuses D09 and D10 supply power supply voltages V1 and V2 to the memory groups 14_4 and 14_5 in two adjacent logical units LU_1 and LU_2.

Furthermore, in a similar manner to FIG. 1, the common power supply apparatus D00 that generates an optical module power supply voltage V3 supplies the power supply voltage V3 to the optical modules 16_1, 16_2, and 16_3 in the three logical units LU_0, LU_1, and LU_2, and the common power supply apparatus D01 that generates an I/O power supply voltage V1 supplies a power supply voltage V1 to the input/output apparatuses I/O in the three logical units.

Figure 8:
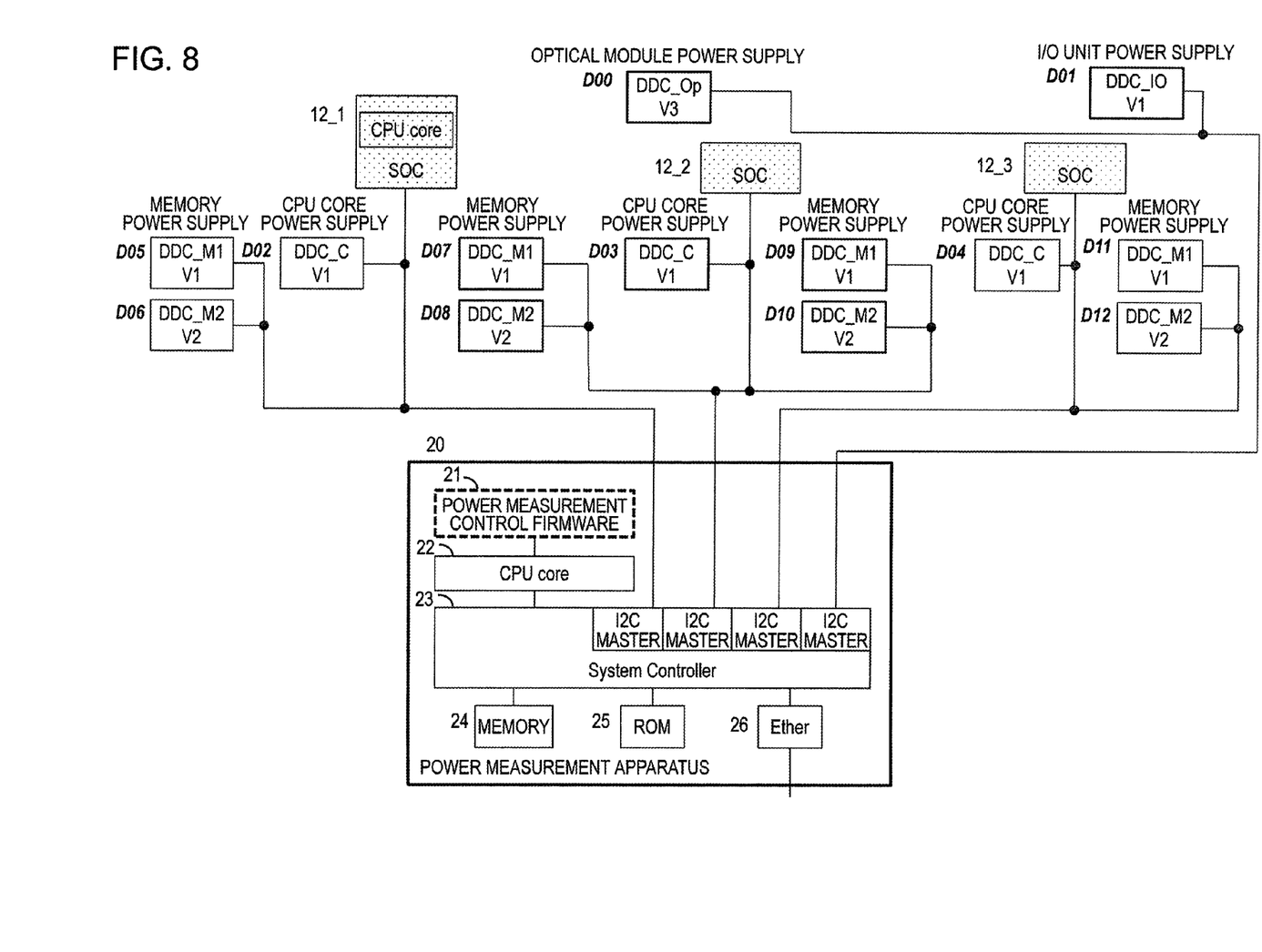
FIG. 8 is a diagram illustrating a configuration example of the power measurement apparatus 20 illustrated in FIG. 7.

FIG. 8 is a diagram illustrating a configuration example of the power measurement apparatus 20 illustrated in FIG. 7. FIG. 8 illustrates CPU chips 12_1, 12_2, and 12_3 connected to the power measurement apparatus 20 to be capable of communication, and power supply apparatuses D00 to D12. The power measurement apparatus 20 is a type of microprocessor including a CPU 22, a memory 24, a ROM 25, an external interface 26 to the Ethernet or the like, and a system controller 23 having an I²C communication circuit. In addition, the power measurement apparatus 20 includes firmware 21 for controlling power measurement and performs power measurement as the CPU executes the firmware 21.

In order to measure power consumption by each logical unit in the information processing apparatus illustrated in FIG. 7, power supplied to each logical unit by the common power supply apparatuses D00, D01, D07, D08, D09, and D10 needs to be calculated according to the method illustrated in FIG. 6. In consideration thereof, the common power supply apparatus D00 of optical modules that is one of the differences of the configuration illustrated in FIG. 7 from that shown in FIG. 1 will be described.

Figure 9:
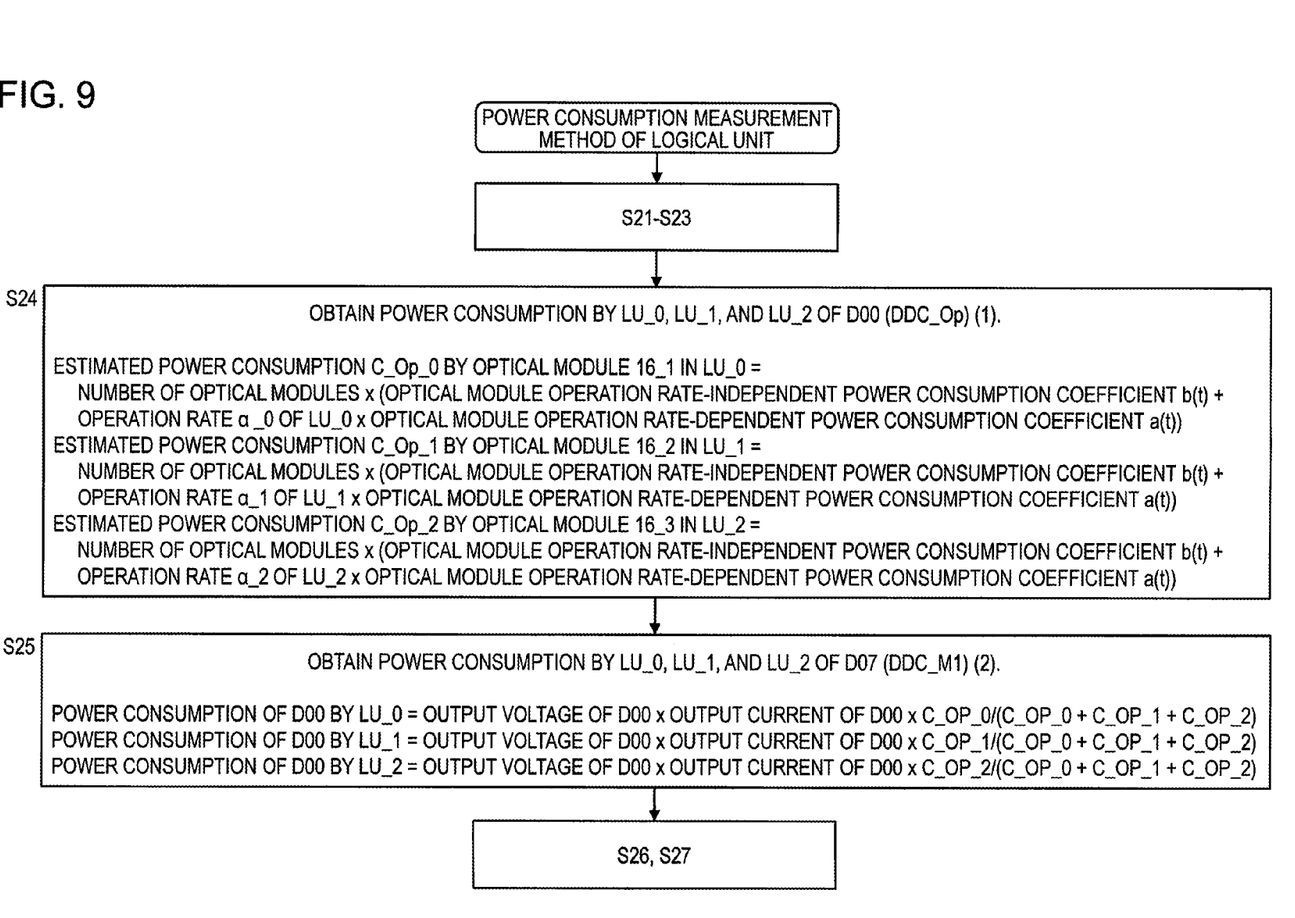
FIG. 9 is a flow chart illustrating a method of measuring power consumption by each logical unit with respect to the common power supply apparatus D00 in the information processing apparatus illustrated in FIG. 7.

FIG. 9 is a flow chart illustrating a method of measuring power consumption by each logical unit with respect to the common power supply apparatus D00 in the information processing apparatus illustrated in FIG. 7. FIG. 9 presents details regarding steps S24 and S25 which differ from FIG. 7. The steps S21, S22, and S23 illustrated in FIG. 7 are also the same for the information processing apparatus illustrated in FIG. 7. However, since the information processing apparatus 10 illustrated in FIG. 7 includes three logical units, operation rates $\alpha\_0$, $\alpha\_1$, and $\alpha\_2$ of CPU cores (or groups of CPU cores) of the three logical units are obtained.

Step S24 illustrated in FIG. 9 is a step of obtaining power consumption by the three logical units with respect to the common power supply apparatus D00. Estimated power consumption by the optical module 16_1 of the logical unit LU_0 is calculated according to the following expression.

Estimated power consumption $C\_Op\_0$ by optical module 16_1 in LU_0=number of optical modules×(operation rate-independent power consumption coefficient $b(t)$ of optical module+ operation rate $\alpha\_0$ of LU_0×operation rate-dependent power consumption coefficient $a(t)$ of optical module) (Expression 7)

In this case, the first and second power consumption coefficients b(t) and a(t) are extracted based on a present operating temperature from data obtained in advance according to FIG. 4. Since three optical modules 16_1 are provided in the logical unit LU_0, the number of logical units in Expression 7 is three.

Estimated power consumption $C\_Op\_1$ and $C\_Op\_2$ by the optical modules 16_2 and 16_3 of the remaining logical units LU_1 and LU_2 are calculated in a similar manner. However, the number of optical modules in the logical unit LU_1 is two and the number of optical modules in the logical unit LU_2 is three. Specific expressions are as presented in FIG. 9.

In step S25 in FIG. 9, a calculation is performed in which actual power consumption as obtained from the output voltage and the output current of the common power supply apparatus D00 is proportionally divided by estimated power consumption of the optical modules of the respective logical units calculated in step S24. For example, power consumption proportional to the logical unit LU_0 of the common power supply apparatus D00 is calculated according to the expression below.

Power consumption of $D00$ by LU_0=output voltage of $D00$×output current of $D00$×$C\_Op\_0$/ ($C\_Op\_0$+$C\_Op\_1$+$C\_Op\_2$) (Expression 8)

In other words, a measured value of power consumption of the common power supply apparatus D00 is proportionally divided by estimated power consumption $C\_Op\_0$, $C\_Op\_1$, and $C\_Op\_2$ of the optical modules of each logical unit. Power consumption proportional to the remaining logical units LU_1 and LU_2 can be calculated in a similar manner to Expression 8 described above. Specific expressions are as presented in FIG. 9.

Calculation for the common power supply apparatus D01 that supplies power to input/output apparatuses I/O of the information processing apparatus illustrated in FIG. 7 is performed in a similar manner to that described above. In addition, power consumption by the logical units LU_0 and LU_1 of the common power supply apparatuses D07 and D08 which supply power to the memories and power consumption by the logical units LU_1 and LU_2 of the common power supply apparatuses D09 and D10 which supply power to the memories are calculated by the formulas presented in FIG. 6.

As described above, with the power measurement apparatus 20 according to the present embodiment, even when a common power supply apparatus that is shared among logical units is provided, an operation rate of a CPU core is obtained from power consumption by the CPU core, an operation rate of each logical unit is estimated from the operation rate of the CPU core, and power distributed to each logical unit by the common power supply apparatus is estimated based on the operation rate of the logical unit. Furthermore, in order to increase accuracy, power consumption of the common power supply apparatus is proportionally divided by estimated power consumption of each logical unit.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A power measurement apparatus of an information processing apparatus, the information processing apparatus including a plurality of logical units each including a CPU chip having a CPU core and a peripheral apparatus at least including a memory, a dedicated power supply apparatus that supplies a power supply voltage to the respective CPU cores, and a common power supply apparatus that supplies a power supply voltage to the peripheral apparatus of the plurality of logical units, the power measurement apparatus comprising:

a memory;
a processor, being accessible to the memory, that executes a process including,
acquiring an output voltage and an output current of the dedicated power supply apparatus and generating output power of the dedicated power supply apparatus;
acquiring a temperature of the CPU chip;
generating an operation rate of the CPU core from a first power consumption coefficient which is independent of the operation rate of the CPU core and a second power consumption coefficient which is dependent on the operation rate of the CPU core and which are coefficients with respect to the temperature of the CPU chip and also from the output power;
estimating power consumption of the peripheral apparatus of the first logical unit from the first power consumption coefficient and the second power consumption coefficient which are coefficients with respect to a temperature of the peripheral apparatus of the first logical unit and also from the operation rate of the CPU core of the first logical unit, and estimating power consumption of the peripheral apparatus of the second logical unit from the first power consumption coefficient and the second power consumption coefficient which are coefficients with respect to a temperature of the peripheral apparatus of the second logical unit and also from the operation rate of the CPU core of the second logical unit; and
generating respective power consumption of the first and second logical units by summing up the output power of the dedicated power supply apparatus and the estimated power consumption of the peripheral apparatus for each of the first and second logical units.

2. The power measurement apparatus according to claim 1, wherein the estimating the power consumption of the peripheral apparatus includes correcting the estimated power consumption of the peripheral apparatus of each of the first and second logical units by proportionally dividing output power obtained from an output voltage and an output current of the common power supply apparatus by the estimated power consumption of the peripheral apparatus in the first logical unit and the estimated power consumption of the peripheral apparatus in the second logical unit.

3. The power measurement apparatus according to claim 1, wherein the estimating the power consumption of the peripheral apparatus includes estimating power consumption of the peripheral apparatuses of the first and second logical units, using first and second power consumption coefficients of the peripheral apparatuses of the first and second logical units at a temperature of a CPU chip in a same logical unit as the peripheral apparatuses.

4. The power measurement apparatus according to claim 1, wherein the estimating the power consumption of the peripheral apparatus includes estimating power consumption of the peripheral apparatuses of the first and second logical units, using first and second power consumption coefficients of the peripheral apparatuses of the first and second logical units at a temperature of the peripheral apparatuses as estimated from a temperature of a CPU chip in a same logical unit as the peripheral apparatuses and from an external temperature.

5. The power measurement apparatus according to claim 1, wherein the process further includes obtaining first and second power consumption coefficients of the CPU core in advance based on first and second output power of the dedicated power supply apparatus for the CPU core obtained in a state where the information processing apparatus is maintained at a prescribed temperature while the CPU core executes first and second programs that respectively operate the CPU core at first and second operation rates, and also based on the first and second operation rates, wherein
the generating the operation rate includes referring the first and second power consumption coefficients of the CPU core at each of a plurality of temperatures.

6. The power measurement apparatus according to claim 5, wherein the process further includes obtaining first and second power consumption coefficients of the peripheral apparatuses in advance based on third and fourth output power of a dedicated power supply apparatus for the peripheral apparatuses obtained in a state where the information processing apparatus is maintained at a prescribed temperature while the CPU core executes third and fourth programs that respectively operate the peripheral apparatuses at third and fourth operation rates and also based on the third and fourth operation rates, wherein the first and second power consumption coefficients of the peripheral apparatuses at each of a plurality of temperatures.

7. The power measurement apparatus according to claim 1, wherein the process further includes obtaining first and second power consumption coefficients of the peripheral apparatuses in advance based on first and second output power of a dedicated power supply apparatus for the peripheral apparatuses obtained in a state where the information processing apparatus is maintained at a prescribed temperature while the CPU core executes first and second programs that respectively operate the peripheral apparatuses at first and second operation rates and also based on the first and second operation rates, wherein the first and second power consumption coefficients of the peripheral apparatuses at each of a plurality of temperatures.

8. The power measurement apparatus according to claim 1, wherein the process further includes acquiring data regarding output voltages and output currents of the dedicated power supply apparatus and the common power supply apparatus.

9. A method of measuring a power of an information processing apparatus, the information processing apparatus including a plurality of logical units each including a CPU chip having a CPU core and a peripheral apparatus at least including a memory, a dedicated power supply apparatus that supplies a power supply voltage to the respective CPU cores, and a common power supply apparatus that supplies a power supply voltage to the peripheral apparatus of the plurality of logical units, the method of measuring the power comprising:
acquiring an output voltage and an output current of the dedicated power supply apparatus and generating output power of the dedicated power supply apparatus;
acquiring a temperature of the CPU chip;
generating an operation rate of the CPU core from a first power consumption coefficient which is independent of the operation rate of the CPU core and a second power consumption coefficient which is dependent on the operation rate of the CPU core and which are coefficients with respect to the temperature of the CPU chip and also from the output power;
estimating power consumption of the peripheral apparatus of the first logical unit from the first power consumption coefficient and the second power consumption coefficient which are coefficients with respect to a temperature of the peripheral apparatus of the first logical unit and also from the operation rate of the CPU core of the first logical unit, and estimating power consumption of the peripheral apparatus of the second logical unit from the first power consumption coefficient and the second power consumption coefficient which are coefficients with respect to a temperature of the peripheral apparatus of the second logical unit and also from the operation rate of the CPU core of the second logical unit; and
generating respective power consumption of the first and second logical units by summing up the output power of the dedicated power supply apparatus and the estimated power consumption of the peripheral apparatus for each of the first and second logical units.

10. The method of measuring the power according to claim 9, wherein the estimating the power consumption includes correcting the estimated power consumption of the peripheral apparatus of each of the first and second logical units by proportionally dividing output power obtained from an output voltage and an output current of the common power supply apparatus by the estimated power consumption of the peripheral apparatus in the first logical unit and the estimated power consumption of the peripheral apparatus in the second logical unit.

11. The method of measuring the power according to claim 9, further comprising:
obtaining first and second power consumption coefficients of the CPU core in advance based on first and second output power of the dedicated power supply apparatus for the CPU core obtained in a state where the information processing apparatus is maintained at a prescribed temperature while the CPU core executes first and second programs that respectively operate the CPU core at first and second operation rates, and also based on the first and second operation rates, wherein
the generating the operation rate includes referring the first and second power consumption coefficients of the CPU core at each of a plurality of temperatures.

12. The method of measuring the power according to claim 11, further comprising:
obtaining first and second power consumption coefficients of the peripheral apparatuses in advance based on third and fourth output power of a dedicated power supply apparatus for the peripheral apparatuses obtained in a state where the information processing apparatus is maintained at a prescribed temperature while the CPU core executes third and fourth programs that respectively operate the peripheral apparatuses at third and fourth operation rates and also based on the third and fourth operation rates, wherein
the estimating the power consumption includes referring the first and second power consumption coefficients of the peripheral apparatuses at each of a plurality of temperatures.

13. The method of measuring the power according to claim 9, further comprising:
obtaining first and second power consumption coefficients of the peripheral apparatuses in advance based on first and second output power of a dedicated power supply apparatus for the peripheral apparatuses obtained in a state where the information processing apparatus is maintained at a prescribed temperature while the CPU core executes first and second programs that respectively operate the peripheral apparatuses at first and second operation rates and also based on the first and second operation rates, wherein
the estimating the power consumption includes referring the first and second power consumption coefficients of the peripheral apparatuses at each of a plurality of temperatures.

* * * * *